(12) United States Patent  
Kogure et al.

(10) Patent No.: US 6,676,224 B2
(45) Date of Patent: Jan. 13, 2004

(54) WHEEL BALANCING DEVICE FOR A TIRE-WHEEL ASSEMBLY

(75) Inventors: Tomohiko Kogure, Hiratsuka (JP); Tatsuo Suzuki, Hiratsuka (JP); Shinji Seimiya, Hiratsuka (JP); Eiji Saito, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 10/322,639

(22) Filed: Dec. 19, 2002

(65) Prior Publication Data

US 2003/0117006 A1 Jun. 26, 2003

(30) Foreign Application Priority Data

Dec. 21, 2001 (JP) .......................... 2001-390042

(51) Int. Cl.$^7$ ................. B60B 1/00; B60B 27/00; B60B 7/01
(52) U.S. Cl. ................................ 301/5.21; 301/37.24
(58) Field of Search .................... 295/6; 301/5.21, 301/5.22, 37.101, 37.24

(56) References Cited

U.S. PATENT DOCUMENTS

| | | | | | |
|---|---|---|---|---|---|
| 2,361,406 | A | * | 10/1944 | Lyon | 301/37.101 |
| 2,926,954 | A | * | 3/1960 | Lyon | 301/5.21 |
| 2,964,356 | A | * | 12/1960 | Lyon | 301/37.34 |
| 3,415,575 | A | * | 12/1968 | Spisak | 301/5.21 |
| 3,799,619 | A | * | 3/1974 | LaBarber | 301/5.22 |
| 3,953,074 | A | * | 4/1976 | Cox | 301/5.22 |
| 4,720,149 | A | * | 1/1988 | Thissen et al. | 301/5.21 |

* cited by examiner

Primary Examiner—S. Joseph Morano
Assistant Examiner—Jason R. Bellinger
(74) Attorney, Agent, or Firm—Rader, Fishman & Grauer PLLC

(57) ABSTRACT

In a tire-wheel assembly, in which a pneumatic tire is installed to a rim of a wheel, an auxiliary ring or auxiliary plate of which dynamic balance has been adjusted is attached coaxially with the wheel onto a rim flange on an outside of the wheel when the tire-wheel assembly is attached onto a vehicle.

10 Claims, 3 Drawing Sheets

US 6,676,224 B2

WHEEL BALANCING DEVICE FOR A TIRE-WHEEL ASSEMBLY

BACKGROUND OF THE INVENTION

The present invention relates to a tire-wheel assembly, and more specifically, to a tire-wheel assembly capable of adjusting a dynamic balance thereof without damaging an exterior appearance thereof.

In general, it is extremely difficult to manufacture a rotational body such as a tire and a wheel highly precisely to a state where unevenness in rotation is completely eliminated. Therefore, in a tire and a wheel, which are used for a vehicle, a dynamic balance thereof is previously measured in a state where the tire and the wheel are assembled as a tire-wheel assembly made by installing the tire on the wheel. Then, adjustment by attaching a balance weight onto the rim flange of the wheel is carried out so that the dynamic balance can be equal to a certain level or lower.

However, a balance weight made of for example lump-shaped lead, zinc, iron or steel has been attached locally onto the rim flange in the conventional adjustment of the dynamic balance, and therefore, the balance weight has inevitably caused a deterioration of the exterior appearance of the tire-wheel assembly.

SUMMARY OF THE INVENTION

It is an object of the present invention to provide a tire-wheel assembly capable of adjusting a dynamic balance thereof without damaging an exterior appearance thereof.

The present invention attaining the foregoing object is a tire-wheel assembly in which a pneumatic tire is installed on a rim of a wheel, characterized in that an auxiliary ring or auxiliary plate operative for adjusting dynamic balance of the tire-wheel assembly is attached coaxially with the wheel onto a rim flange on an outside of the wheel when the tire-wheel assembly is attached onto a vehicle.

The auxiliary ring or auxiliary plate of which dynamic balance has been adjusted is attached coaxially with the wheel onto the rim flange of the tire-wheel assembly in such a manner. Therefore, the auxiliary ring or auxiliary plate becomes similar in shape to the circular tire and wheel. Accordingly, the tire-wheel assembly of adjusted for dynamic balance can be obtained without causing any feeling of wrongness on the exterior appearance thereof.

BRIEF DESCRIPTION OF THE DRAWINGS

FIG. 4b is a view on an arrow X in FIG. 4a.

DESCRIPTION OF THE PREFERRED EMBODIMENTS

Figure 1A:
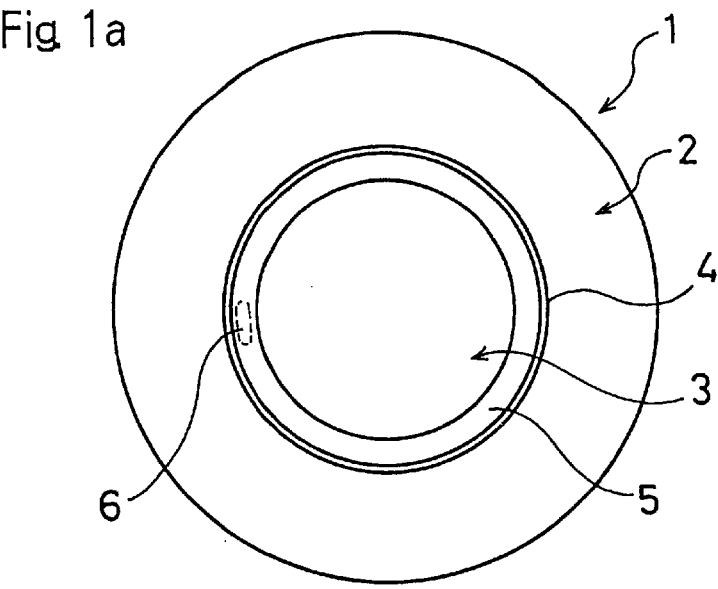
FIG. 1a is a side view showing an embodiment of a tire-wheel assembly of the present invention, seen from an axis direction of a tire.
Figure 1B:
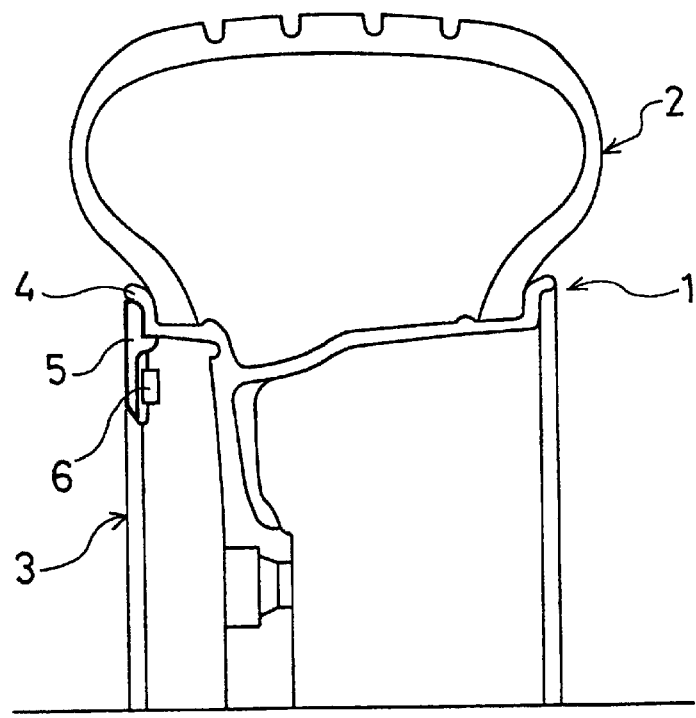
FIG. 1b is a semi-cross-sectional view of the tire-wheel assembly of FIG. 1a, cut along a meridian cross section of the tire.

FIGS. 1a and 1b exemplify the tire-wheel assembly of the present invention.

The tire-wheel assembly 1 shown in FIGS. 1a and 1b is constituted by installing the pneumatic tire 2 on a rim of a wheel 3. The auxiliary ring 5 formed in a circular ring shape is attached outside onto the face of the wheel 3.

When the tire-wheel assembly 1 is attached onto an axle of a vehicle, the circular auxiliary ring 5 is attached coaxially with the rim flange 4 on the outside of the wheel 3 of the tire-wheel assembly 1. The balance weight 6 is fitted onto the position on the back surface of the auxiliary ring 5, which is hidden from the outside. Accordingly, if the position of the balance weight 6 with respect to the circumference direction of the wheel 3 is adjusted when the auxiliary ring 5 is attached coaxially with the rim flange 4, then the dynamic balance of the entire tire-wheel assembly can be set at a stable and constant level.

Figure 2A:
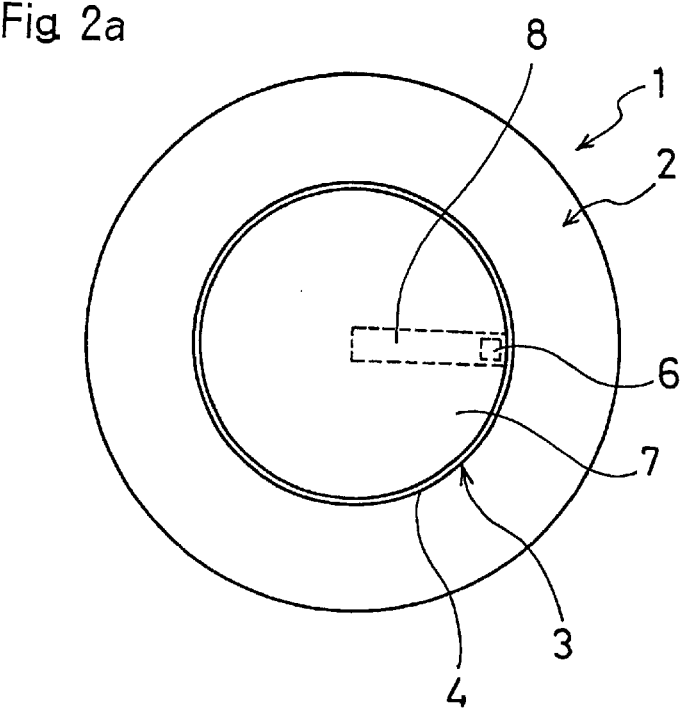
FIG. 2a is a side view showing another embodiment of the tire-wheel assembly of the present invention, seen from an axis direction of a tire.
Figure 2B:
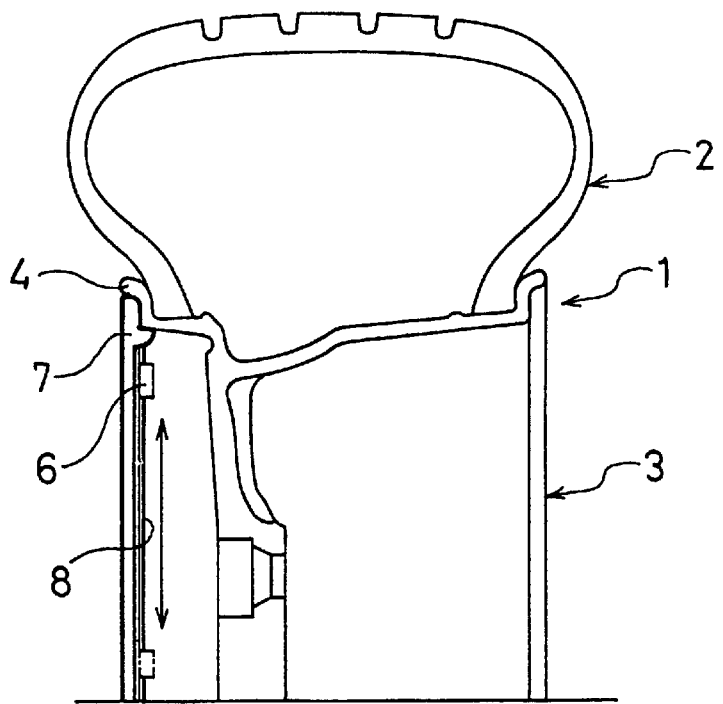
FIG. 2b is a semi-cross-sectional view of the tire-wheel assembly of FIG. 2a, cut along the meridian cross section of the tire.

FIGS. 2a and 2b illustrate another embodiment of the tire-wheel assembly of the present invention.

The tire-wheel assembly 1 shown in FIGS. 2a and 2b is constituted by installing the pneumatic tire 2 on the rim of the wheel 3 similarly to the embodiment of FIG. 1. The auxiliary plate 7 formed in a disc shape is attached onto the face of the wheel 3.

When the tire-wheel assembly 1 is attached onto an axle of a vehicle, the disc-shaped auxiliary plate 7 is attached coaxially with the rim flange 4 on the outside of the wheel 3 of the tire-wheel assembly 1. The balance weight 6 is fitted onto the position on the back surface of the auxiliary plate 7 so as to be movable in the radius direction. Accordingly, the balance weight 6 is moved in the radius direction for adjustment and fixed at a specific position, and thus the dynamic balance of the entire tire-wheel assembly can be set at a stable and constant level.

In the present invention, different types of the auxiliary rings 5 and the auxiliary plates 7 can be provided with the dynamic balance adjustment function as described above and it is possible to select any one for use. With a plurality of different types of auxiliary rings 5 and auxiliary plates 7 it is possible to adjust the dynamic balance of many different types of tire-wheel assemblies.

Moreover, as another method, another balance weight 6 may be detachably added to the auxiliary ring 5 or the auxiliary plate 7. As described above, an embodiment of the invention is adopted, in which another balance weight 6 can be added and removed thereto/therefrom, thus making it possible to adjust the dynamic balance over a wider range of dynamic imbalance. Furthermore, the balance weight 6 attached to the auxiliary ring 5 or the auxiliary plate 7 may be detached and thereafter exchanged with one of a variety of other balance weights 6 with respective ones of the other balance weights varying in weight.

Figure 3:
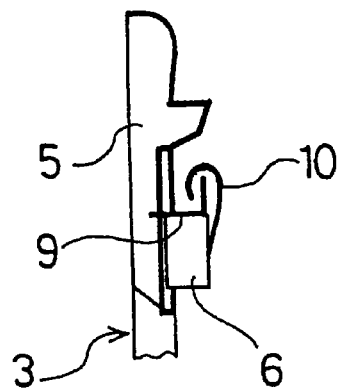
FIG. 3 is a longitudinal-cross-sectional view showing principal portions of yet another embodiment of the tire-wheel assembly of the present invention.
Figure 4A:
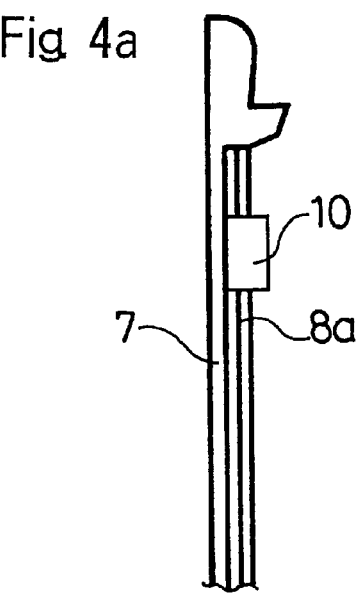
FIG. 4a is a longitudinal-cross-sectional view showing principal portions of still another embodiment of the tire-wheel assembly of the present invention.
Figure 4B:
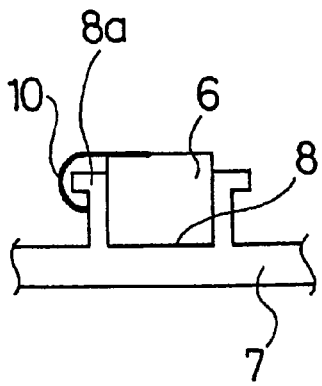

As means for making it possible to detachably exchange the balance weight 6 with others as described above, a spring, a screw, a slit or a double-faced adhesive tape can be utilized. For example, FIG. 3 shows an example of detachably attaching the balance weight 6 by utilizing a spring. The hook 9 is previously provided on the auxiliary ring 5, and the balance weight 6 is attached onto the hook 9 so as to be pinched with pressure by the spring 10. Moreover, FIGS. 4a and 4b show an example of attaching the balance weight 6 by utilizing a slit. The slit-shaped guide groove 8 is provided in the radius direction of the auxiliary plate 7. The balance weight 6 is movably and slidably inserted into the guide groove 8. Then, the balance weight 6 is pinched by the groove flanges 8a with the pressure of the spring 10 and is therefore held in the guide groove 8.

In order to make it possible to adjust the dynamic balance variously only by one type of the auxiliary ring or auxiliary plate, it is recommended to movably attach the balance weight 6 in the radius direction of the auxiliary plate 7 or the auxiliary ring and to make it possible to fix the plate or the ring at an arbitrary position in the radius direction as the embodiment of FIGS. 2a and 2b.

In the embodiment of FIGS. 2a and 2b, the balance weight 6 is made movable along the guide groove 8 provided on the auxiliary plate 7 and can be fixed at an arbitrary position thereof by fixing means (not shown) such as a screw. Therefore, this dynamic balance adjustment mechanism can arbitrarily adjust the dynamic balance of the tire-wheel assembly only by adjusting the position of one type of the balance weight 6 in the radius direction. Accordingly, if the plural types of auxiliary plates or auxiliary rings constructed as describe above are prepared, then the dynamic balances for many types of the tire-wheel assemblies can be adjusted.

Although the material of the auxiliary ring and the auxiliary plate may be any of metal and resin in the present invention, resin is more preferable in terms of reducing a weight increase of the tire-wheel assembly. Moreover, for the material of the balance weight, a simple substance of heavy metal such as lead and tungsten or one obtained by mixing the powder of the heavy metal into resin such as polyamide resin and polypropylene resin can be used.

Although the examples where the balance weight is combined with the auxiliary ring or the auxiliary ring plate have been described in the above-described embodiments, the mass distribution of the auxiliary ring or auxiliary plate itself may be adjusted as adjusting means for the dynamic balance.

The pneumatic tire for use in the tire-wheel assembly of the present invention is not particularly limited, and can be used for any of the following: a tire for a passenger car; a tire for a heavy load, such as for a bus and a truck; and a tire of a light truck. Moreover, the structure of the tire may be any of radial and bias.

As described above, according to the tire-wheel assembly of the present invention, the auxiliary ring or auxiliary plate of which dynamic balance has been adjusted is attached coaxially with the wheel onto the rim flange on the outside of the wheel when the tire-wheel assembly is attached onto a vehicle. Therefore, the auxiliary ring or auxiliary plate becomes similar in shape to the circular tire or wheel. Accordingly, the dynamic balance can be adjusted without causing any feeling of wrongness on the exterior appearance of the assembly.

What is claimed is:

1. A wheel balancing device for a tire-wheel assembly that rotates about an axis of rotation, the tire-wheel assembly including a wheel having a rim flange on an outwardly facing surface of the wheel, the wheel balancing device comprising:

a ring member attached coaxially about the axis of rotation to the wheel on the rim flange and spaced radially apart from the axis of rotation, the ring member having a front surface and an opposite rear surface; and a balance weight slidably and fixedly connectable to the rear surface of the ring member and radially slidable to a select location to dynamically balance the tire-wheel assembly, the balance weight being fixed to the ring member in a stationary state at the select location.

2. A wheel balancing device for a tire-wheel assembly according to claim 1, further comprising a groove guide having a pair of groove flanges connected to the rear surface of the ring member to define a groove therebetween extending in a radial direction and sized to slidably receive the balance weight.

3. A wheel balancing device for a tire-wheel assembly according to claim 2, wherein the balance weight is disposed within the groove with the pair of groove flanges being in a close-fitting relationship with the balance weight.

4. A wheel balancing device for a tire-wheel assembly according to claim 3, wherein the pair of groove flanges are pinched against the balance weight.

5. A wheel balancing device for a tire-wheel assembly according to claim 2, further comprising a spring that applies a spring force against the balance weight.

6. A wheel balancing device for a tire-wheel assembly that rotates about an axis of rotation, the tire-wheel assembly including a wheel having a rim flange on an outwardly facing surface of the wheel, the wheel balancing device comprising:

a plate member attached coaxially about the axis of rotation to the wheel on the rim flange, the plate member having a front surface and an opposite rear surface; and a balance weight slidably and fixedly connectable to the rear surface of the plate member and radially slidable to a select location to dynamically balance the tire-wheel assembly, the balance weight being fixed to the plate member in a stationary state at the select location.

7. A wheel balancing device for a tire-wheel assembly according to claim 6, further comprising a groove guide having a pair of groove flanges connected to the rear surface of the plate member to define a groove therebetween extending in a radial direction and sized to slidably receive the balance weight.

8. A wheel balancing device for a tire-wheel assembly according to claim 7, wherein the balance weight is disposed within the groove with the pair of groove flanges being in a close-fitting relationship with the balance weight.

9. A wheel balancing device for a tire-wheel assembly according to claim 8, wherein the pair of groove flanges are pinched against the balance weight.

10. A wheel balancing device for a tire-wheel assembly according to claim 7, further comprising a spring that applies a spring force against the balance weight.

\* \* \* \* \*